3,485,463
CONTROL STICK TRANSDUCER
Ronald J. Miller, Phoenix, Ariz., assignor to Sperry Rand Corporation, a corporation of Delaware
Filed May 21, 1968, Ser. No. 730,885
Int. Cl. B64c *13/04, 13/50*
U.S. Cl. 244—83                            4 Claims

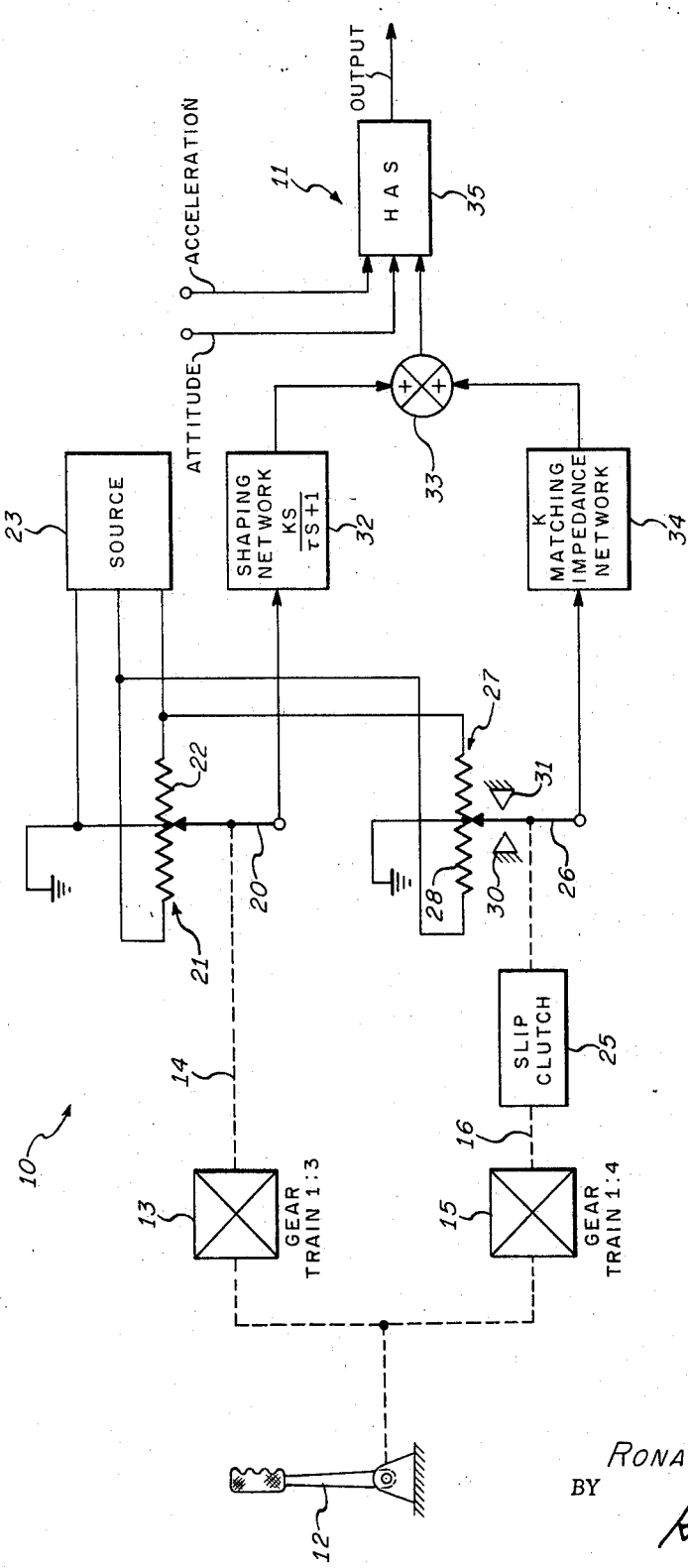

ABSTRACT OF THE DISCLOSURE

A control stick transducer for use in automatic control systems which accepts a mechanical input from a control stick and provides parallel electrical outputs, one being proportional to the displacement of the control stick and the other being proportional to the stick position relative to a movable reference within limits.

BACKGROUND OF THE INVENTION

Field of the invention

The present invention relates to control stick transducers used in conjunction with automatic control systems, for example, automatic flight control systems for aircraft.

Description of the prior art

Prior art control stick transducers utilize a sensor that is clutched to the control stick in order that it can be disengaged during the transition from one flight condition to another. The clutch is then re-engaged when the new trim condition is established. The prior art arrangement not only requires additional operations to change flight conditions than is necessary with respect to the present invention but also deprives the pilot of the use of the stabilization system during a flight condition change. Further, it necessitates de-energization and re-energization of the clutching device.

SUMMARY OF THE INVENTION

The present invention concerns a control stick transducer which accepts a mechanical input from a control stick and by virtue of first and second parallel signal paths provides a first signal in accordance with the movement of the control stick and a second signal proportional to the stick position relative to a movable reference. The second signal path includes a slip clutch and mechanical limiting means with respect to second signal generating means such that small movements of the control stick within the limits defined by the limiting means provides a second signal in accordance with the control stick movements and for movements in excess of the predetermined limits, the slip clutch slips and a new reference position is established. This permits continuous use of the stabilization system throughout flight condition changes and automatic resynchronization of the transducer without requiring additional concentration or manual operations by the pilot. This type of transducer is particularly advantageous with respect to helicopter and VTOL aircraft which require unusual concentration by the pilot to achieve precise flight path control especially when hovering and in forward flight and during the transition therebetween.

BRIEF DESCRIPTION OF THE DRAWING

The single figure of the drawing is a schematic diagram showing the control stick transducer of the present invention applied to an automatic flight control system.

DESCRIPTION OF THE PREFERRED EMBODIMENT

The control stick transducer 10 of the present invention will be explained with respect to its application in an automatic flight control system 11 which may be of the character disclosed in U.S. patent application Ser. No. 659,473 entitled "Control Apparatus for VTOL Aircraft," invented by Robert S. Buffum et al. and filed Aug. 9, 1967. The control stick transducer 10 is connected to be responsive to the movements of a control stick 12. It will be appreciated that the control stick 12 may alternatively take the form of a control wheel or pedals which provide either rotary or translatory motion. The control stick 12 in the example shown is mechanically connected to provide rotary motion to the input of a gear train 13 in a first parallel signal path 14 and simultaneously to the input of a gear train 15 in a second parallel signal path 16. The output of the gear train 13 is connected to the wiper arm 20 of a potentiometer 21 also disposed in the first signal path 14. The potentiometer 21 has its resistive potentiometer winding 22 energized by a suitable excitation source 23 with the center of the potentiometer winding 22 connected to ground potential in order that movement of the wiper arm 20 from its centralized position provides a signal having a phase and amplitude representative of the direction and magnitude of the movement of the control stick 12 from its centralized position.

The output of the gear train 15 is connected through a slip clutch 25 to the wiper arm 26 of a second potentiometer 27. The potentiometer 27 has its resistive potentiometer winding 28 also energized by the excitation source 23 with the center of the winding 28 likewise connected to ground potential. First and second spaced mechanical limit stops 30 and 31, respectively, are disposed on opposite sides of the wiper arm 26 to permit equal movement of the wiper arm 26 from its centralized position within predetermined limits defined by the stops 30 and 31. The slip clutch 25, potentiometer 28 and stops 30 and 31 form a portion of the second parallel signal path 16.

The output of the potentiometer 21 from the wiper 20 is connected to a shaping or wash-out network 32 which may have a transfer function of the form $$\frac{KS}{\tau S+1}$$

and may be of the type disclosed in said U.S. application of Ser. No. 659,473. The shaping network 32 is also known in the flight control art as a wash-out circuit since it provides an output signal that slowly goes to zero as explained in greater detail in said U.S. patent application Ser. No. 659,473. The output of the network 32 is connected to an input terminal of an algebraic summation device 33.

The output of the potentiometer 27 from its wiper arm 26 is connected directly via a matching impedance network 34, which may, for example, be a resistor of appropriate value to another input terminal of the algebraic summation device 33. The device 33 has its output connected to a servo control system 35 which may, for example, be a hover augmentation system (HAS). The servo control system 35 also receives attitude and acceleration inputs as indicated by the respective legends to provide an output signal to the control surfaces of the aircraft in a manner explained in detail in said U.S. application Ser. No. 659,473.

In operation, movement of the control stick 12 by the pilot in an aircraft stabilization system such as the type described in said U.S. patent application Ser. No. 659,473, provides a command to the hover augmentation system 35 to achieve a desired aircraft response. The movement of the control stick 12 is transmitted through the gear train 13 which positions the wiper arm 20 with respect to the winding 22 to provide a signal proportional to the position of the control stick 12. A step function stick position change, for example, commands an acceleration of the aircraft through the wash-out network 32 for a short period that results in a steady state aircraft velocity change.

The second parallel signal path 16 is a direct path having a low limit defined by the mechanical stops 30 and 31. Through this path a limited steady state aircraft acceleration is commanded when the control stick 12 is displaced since, within the limits defined by the stops 30 and 31, a continuous signal is provided by the potentiometer 27 to the hover augmentation system (HAS) 35 when the wiper arm 26 is displaced from its central position. The primary purpose of the signal from the second parallel signal path is to provide a nulling signal at the input to the HAS system 35 to compensate for null offset errors in the flight control system components such as gyros, accelerometers or electronic components. Thus, the pilot, by making very small stick motions about the trim conditions can transmit a signal from the control stick 12 through the gear train 15 and slip clutch 25 to slightly displace the wiper arm 26 within the limits of the stops 30 and 31 to balance any null offsets in the system. The use of this trim signal allows utilization in the flight control system 11 of "autopilot" quality components rather than requiring more expensive and complex "inertial navigation" quality components while maintaining excellent system performance.

When the pilot desires to change flight conditions, e.g., accelerate from hover to 80 knots forward velocity, means must be provided to synchronize the signal source for the direct path i.e., the second parallel signal path, so that the pilot may make small null corrections about the newly established trim condition. With previous stick position transducer designs, it was necessary to use a sensor with a clutch which could be disengaged while the transition from one flight condition to the other was being made. The clutch could only be re-engaged once the new trim condition was established. The prior art arrangement therefore required not only precise and continuous concentration by the pilot as well as more manual operations to change flight conditions, but in addition it also deprived the pilot of the benefits of the stabilization system during the flight condition change.

In accordance with the present invention, the potentiometer 21 provides the primary command signal only and this potentiometer is essentially self-synchronizing since its command signal is washed-out by the wash-out network 32 after a predetermined time interval. The potentiometer 27, on the other hand, provides the limited direct signal with the signal limits being defined by the mechanical stops 30 and 31. The synchronizing function is provided by the slip clutch 25. When the control stick 12 is moved such that the wiper arm 26 reaches the mechanical limits defined by one of the stops 30 or 31, the clutch 25 slips thereby establishing a new reference position. At the completion of the transition to the new flight condition, the output of the potentiometer 21 goes to zero by the operation of the wash-out network 32 and the wiper 26 of potentiometer 27 is free to operate about its central position within the limits defined by the mechanical stops 30 and 31 even though the control stick 12 operates about trim for the flight condition just established.

Therefore, the pilot has the benefit of the stabilization system throughout the flight condition change. Further, synchronization of the control stick transducer 10 is accomplished automatically without requiring any attention by the pilot or any additional manual operation by the pilot and without requiring de-energization and re-energization of the clutches which may introduce undesirable transients in the control system 35.

While the invention has been described in its preferred embodiment, it is to be understood that the words which have been used are words of description rather than limitation and that changes within the purview of the appended claims may be made without departing from the true scope and spirit of the invention in its broader aspects.

I claim:
1. A control stick transducer for use in an automatic control system subject to null offset errors and adapted to be connected between a movable control stick and said control system comprising
    a first parallel signal path having first signal generating means adapted to be connected to said control stick for providing a first signal in accordance with the movement of said control stick,
    a second parallel signal path having slip clutch means adapted to be connected to said control stick and second signal generating means connected to said slip clutch means for providing a second signal, and
    mechanical limiting means cooperative with said second signal generating means and so arranged that for small movements of said control stick within predetermined limits the value of said second signal is in accordance with said movements and for movements in excess of said predetermined limits said slip clutch means slips and said second signal does not exceed a value defined by said limits, the value within said limits being adequate to compensate for null offset errors.

2. A control stick transducer of the character recited in claim 1 in which said first parallel signal path further includes a wash-out network responsive to said first signal for slowly reducing a function of said first signal to zero in a predetermined manner, said second signal is applied directly to said system, and further including summation means responsive to said signals for providing an output signal in accordance with the algebraic summation thereof.

3. A control stick transducer of the character recited in claim 1 in which said first parallel signal path includes first gear train means connected between said control stick and said first signal generating means and said second parallel signal path further includes second gear train means connected between said control stick and said slip clutch means.

4. A control stick transducer of the character recited in claim 2 in which said second signal generating means comprises potentiometer means having a wiper arm responsive to the movement of said control stick and a potentiometer winding having its central reference point grounded, and said mechanical limiting means include spaced mechanical stops for providing limited movement of said wiper arm about a central position defined by said central reference point whereby movement of said control stick to effect a new operating condition provides a control signal that slowly goes to zero via said first wash-out circuit and a null offset signal from said second signal generating means to provide null error compensation about a new reference point.

References Cited

UNITED STATES PATENTS 2,859,926 11/1958 Westbury _____ 244—83 XR
3,369,161 2/1968 Kaufman.

ANDREW H. FARRELL, Primary Examiner

U.S. Cl. X.R.

244—77; 318—20